(12) United States Patent
Lee et al.

(10) Patent No.: US 6,512,076 B2
(45) Date of Patent: Jan. 28, 2003

(54) POLY (ARYLENE ETHER SULFIDE) AND POLY (ARYLENE ETHER SULFONE) FOR OPTICAL DEVICE AND METHOD FOR PREPARING THE SAME

(75) Inventors: Jae Suk Lee, Kwangju (KR); Jang Joo Kim, Kwangju (KR); Jae Pil Kim, Kwangju (KR); Jae Wook Kang, Kwangju (KR); Won Young Lee, Kwangju (KR)

(73) Assignee: Kwangju Institute of Science and Technology, Kwangju (KR)

( * ) Notice: Subject to any disclaimer, the term of this patent is extended or adjusted under 35 U.S.C. 154(b) by 0 days.

(21) Appl. No.: 09/935,836

(22) Filed: Aug. 24, 2001

(65) Prior Publication Data

US 2002/0115815 A1 Aug. 22, 2002

(30) Foreign Application Priority Data

Dec. 19, 2000 (KR) ............................................ 00-78167

(51) Int. Cl.$^7$ ............................................... C08G 75/23
(52) U.S. Cl. .......................... 528/171; 528/86; 528/219; 528/373; 528/391; 528/401
(58) Field of Search .......................... 528/86, 171, 219, 528/373, 391, 401

(56) References Cited

U.S. PATENT DOCUMENTS 3,076,784 A * 2/1963 Schulte Huermann et al. ........................... 521/174
6,136,929 A * 10/2000 Han et al. ................... 525/534

* cited by examiner

*Primary Examiner*—Robert Dawson
*Assistant Examiner*—Marc Zimmer
(74) *Attorney, Agent, or Firm*—Rosenberg Klein & Lee

(57) ABSTRACT

Disclosed are polyarylene ether sulfides and polyarylene ether sulfones for optical device and a method for preparing the same. Polyarylene ether sulfides containing fluorine and polyarylene ether sulfones containing fluorine are synthesized through polycondensation of pentafluorophenyl sulfide and pentafluorophenyl sulfone monomer with dihydroxy monomer. In addition, by attaching ethynyl phenol and phenylethynylphenol to terminals of the high molecular weight polymer, solvent resistance of the polymer is increased. Thus, the high molecular weight polymers prepared by very simplified process have low light loss, excellent resistance for heat, solvent and water, and so can be used to manufacture inactive optical waveguide devices.

7 Claims, 15 Drawing Sheets

Chemical shift (ppm)

Chemical shift (ppm)

POLY (ARYLENE ETHER SULFIDE) AND POLY (ARYLENE ETHER SULFONE) FOR OPTICAL DEVICE AND METHOD FOR PREPARING THE SAME

BACKGROUND OF THE INVENTION

1. Field of the Invention

The present invention relates to sulfone and sulfide high molecular weight polymer containing fluorine for optical devices and a method for preparing the same. More specifically, the present invention relates to polyarylene ether sulfide and polyarylene ether sulfone containing fluorine for optical device through polycondensation of pentafluorophenyl sulfide and pentafluorophenyl sulfone monomer with dihydroxy monomer, and, in particular, a high molecular weight polymer having increased solvent resistance by attaching ethynyl phenol and phenylethynylphenol to terminals of the high molecular weight polymer; and a method for preparing the same.

2. Description of the Prior Art

In broadband communication networks of the future, picture communications, including videoconference, high definition television video transmission and so on, will be coupled to telephone communication networks. Therefore, information demands for each person will be explosively increased and thus transfer rates of hundreds of Mbps will be required. In the future, basic information processing systems are expected to require transfer rates of Tbps (tera bit per second) and to be responsible for transmission by use of wavelength division or frequency division, instead of time division.

In order to realize the wavelength division optical processing system, active optical signal processing devices, such as a high speed optical modulator and a switch, as well as various inactive optical waveguide devices including optical output divider, wavelength division multiplexer, or optical output coupler, are required.

The properties necessary to manufacture optical waveguide devices include stabilities for light loss, heat and environment (humidity), polarization dependency, and ease of process and packaging. Commonly, to manufacture inactive optical waveguide devices, silica has been used, but a high molecular weight polymer in which fluorine is substituted for hydrogen has recently been used. Such fluorine-containing high molecular weight polymer has excellent properties as electronic material, including high thermal and chemical stabilities, and low dielectric constant, low refractive index, and low hygroscopic coefficient.

Organic materials suitable for use as optical waveguide devices developed until now are exemplified by polyimides and polyarylene ether (PAEs) containing fluorine, in which both materials have high thermal stability suitable for manufacturing optical devices. Polyimides have excellent thermal stability but are disadvantageous in terms of high birefringence and light loss, and thus the limitations of the material itself cannot be overcome. Meanwhile, polyarylene ether has ether groups with high flexibility so that it can be favorably used to manufacture the devices, though having similar properties to those of polyimides. Examples of fluorine-containing high molecular weight polymers useful as materials for optical waveguides include commercially available Udel (polyether sulfone), Kadel (polyetherketone), PEEK (poly(etheretherketone)), and Victrex.

However, said high molecular weight polymers suffer from the disadvantages of complicated manufacturing process of the optical device, high light loss or birefringence.

SUMMARY OF THE INVENTION

Accordingly, an object of the present invention for alleviating the problems as described above is to provide a high molecular weight polymer synthesized through polycondensation of fluorine-containing sulfone and sulfide monomer with dihydroxy monomer and a method for preparing the same, and a method for preparing the same, which is advantageous in ease preparation and low light loss polymer.

Another object of the present invention is to provide a high molecular weight polymer having increased resistance to solvent, heat and water, by attaching thermally crosslinkable groups to terminals of prepared polymer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

According to the present invention, sulfone and sulfide polymers containing fluorine are synthesized, which have similar thermal stability to, and lower light loss and birefringence than, those of polyimides.

Fluorine-containing polymers have superior properties suitable for use as electronic materials, such as excellent thermal and chemical stabilities, low dielectric constant, low refractive index and low hygroscopic coefficient.

PAEs synthesized by nucleophilic substitution reaction have advantages of being able to control glass transition temperature and physical properties, because high molecular weight polymers can be obtained and necessary monomers can be combined.

In the present invention, by performing polycondensation of polysulfides or polysulfones, useful as PAE, and dihydroxy compounds, fluorine-containing polyarylene ether sulfides or fluorine-containing polyarylene ether sulfones which have excellent properties can be synthesized.

The properties of polysulfides or polysulfones used in the present invention depend on the combination of ether with sulfide or sulfone groups, in which such monomer has a structure as represented by the following formula 1:

Generally, these groups have different bonding angles, for example, 180° for sulfide, 109° for sulfone, and 125° for ether. Hence, high molecular weight polymers are not crystallized and have amorphous structure, thus complementing the flexibility and rigidity of each other, thereby having excellent properties, such as high glass transition temperature and solvent resistance.

Dihydroxy compounds used in the preparation of polymer of the present invention comprise 9,9'-bis(4-hydroxyphenyl)fluorene, 2,2', 3,3',5,5',6,6'-octafluoro-4,4'-biphenol, 4,4'-isopropylenediphenol, and 4,4'-(hexafluoroisopropylidene)diphenol [6F-BPA]. Of them, 6F-BPA compounds are most preferable.

Aprotic solvents include N-methylpyrrolidone (NMP), and N,N-dimethylacetamide (DMAc), and azotropic solvents are exemplified by benzene, and toluene.

In order to increase thermal stability, thermally crosslinkable ethynyl groups are attached to terminal groups of polymers.

A better understanding of the present invention may be obtained in light of the following examples which are set forth to illustrate, but are not to be construed to limit the present invention.

EXAMPLE 1

Synthesis of Fluorine-containing Poly(arylene ether sulfide) [PSI]

Fluorine-containing PSI can be prepared according to the following reaction formula 1:

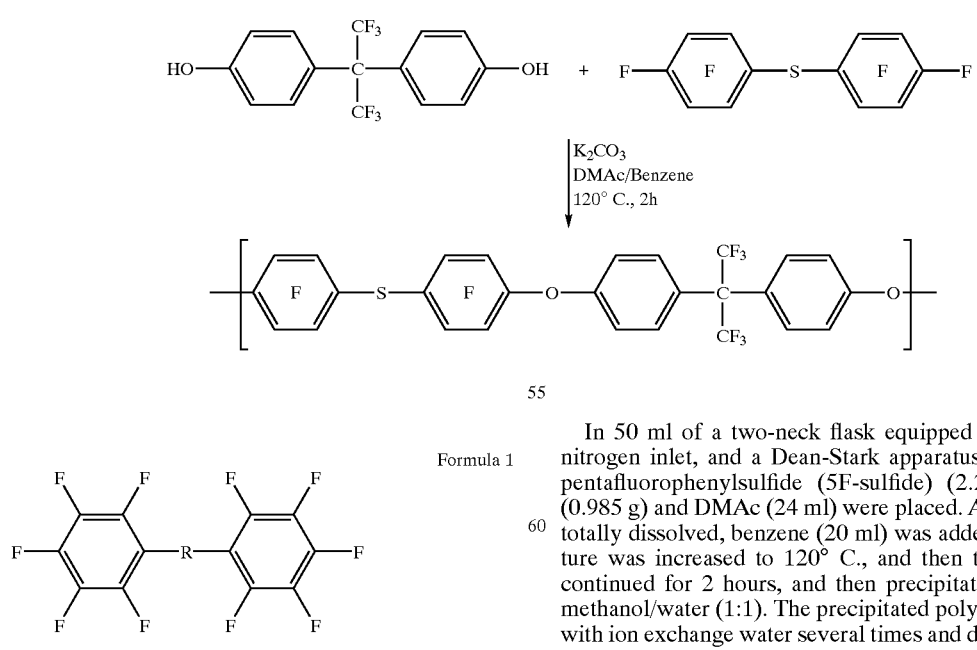

Reaction Formula 1

Formula 1

Wherein, R is sulfide (—S—) or sulfone (—SO$_2$—).

Figure 1:
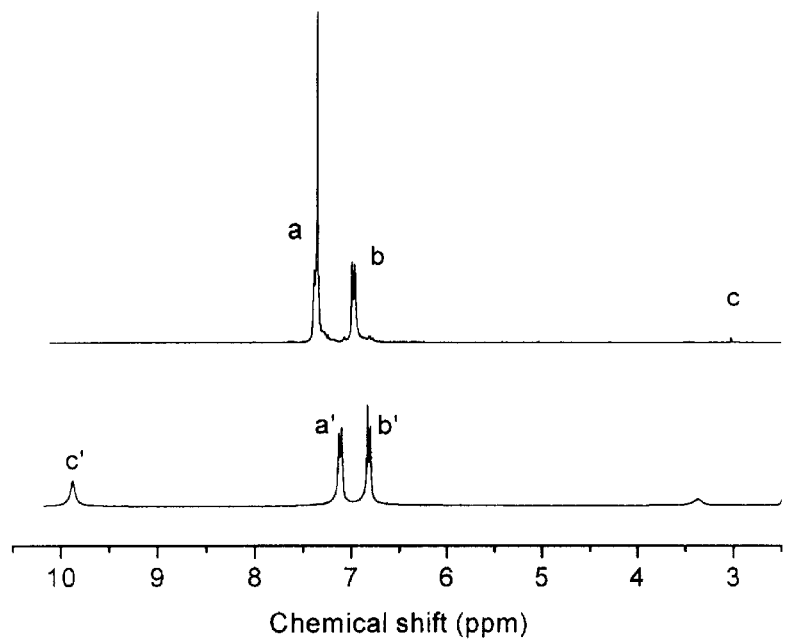
FIG. 1 shows $^1$H-NMR spectra of Poly(arylene ether sulfide) (PSI) (top) and 6F-BPA (down).
Figure 2:
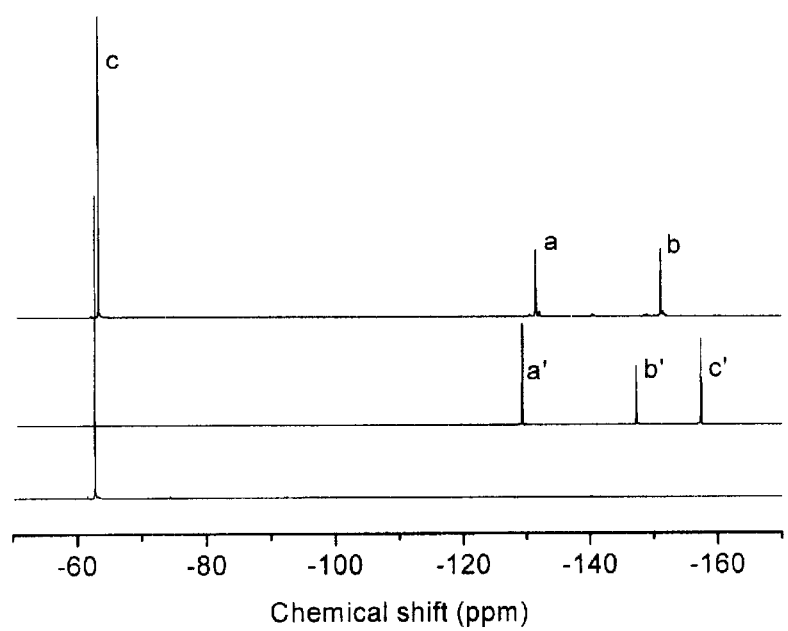
FIG. 2 shows $^{19}$F-NMR spectra of PSI (top), 5F-sulfide (medium) and 6F-BPA (down).
Figure 3:
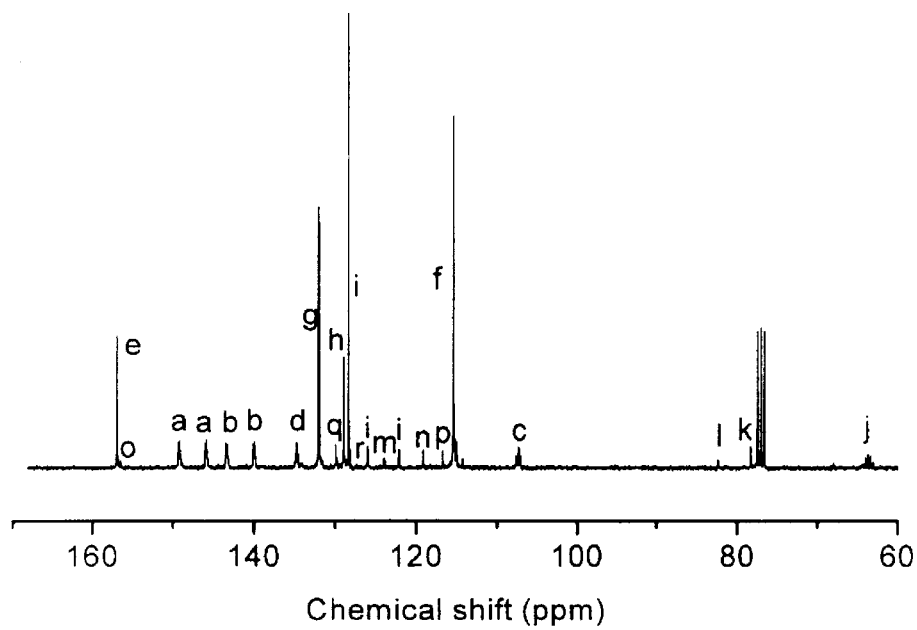
FIG. 3 shows $^{13}$C-NMR spectra of PSI, 5F-sulfide and 6F-BPA.

In 50 ml of a two-neck flask equipped with a stirrer, a nitrogen inlet, and a Dean-Stark apparatus, 6F-BPA (2 g), pentafluorophenylsulfide (5F-sulfide) (2.267 g), K$_2$CO$_3$ (0.985 g) and DMAc (24 ml) were placed. After K$_2$CO$_3$ was totally dissolved, benzene (20 ml) was added. The temperature was increased to 120° C., and then the reaction was continued for 2 hours, and then precipitated in 400 ml of methanol/water (1:1). The precipitated polymer was washed with ion exchange water several times and dried in a vacuum drier for 3 days. The molecular weight of polymer might be controlled by changing molar ratio of each monomer. In addition, a suitable reaction temperature range is 100° C. to 168° C., and 120° C. in this case. The structure of polymer was analyzed with $^1$H-NMR (FIG. 1), $^{19}$F-NMR (FIG. 2) and $^{13}$C-NMR (FIG. 3). From all hydrogen peaks the shifting of downfield, it was found that hydrogen atoms of 6F-BPA were replaced with perfluorophenylene groups to form high molecular weight polymer. Additionally, the widths of all peaks were broadened because polymer was formed by polycondensation. As the result of $^{19}$F-NMR analysis, it could be seen that, from the shown three peaks, F at para-positions in pentafluorophenyl groups was eliminated during polymerization. In $^{13}$C-NMR analysis, there were two peaks corresponding to carbon of para-position in pentafluorophenyl groups (144.2 ppm and −139.2 ppm) before polymerization, and one peak (147.0 ppm) after polymerization. This means that, instead of coupling by fluorine, polycondensation is conducted so that the peak is shifted.

The molecular weight of the polymer is intimately associated with refractive index and physical properties. Therefore, control of molecular weight allows the preparation of polymer to be advantageous. In the measurement of the molecular weight, THF was used as solvent and polystyrene as a standard material. The change of molecular weight according to added amounts is shown in Table 1, below. In the case of PSI, the molecular weight ranged from 10,200 to 25,400, and the molecular weight distribution was 1.99–2.45.

TABLE 1

| | 6F-BPA/ Penta Fluorosulfide | Calculated M.W. | Observed M.W. | Degree of Dispersion | Yield (%) | Glass Transition Temp. (° C.) |
|---|---|---|---|---|---|---|
| PSI-1 | 0.9043 | 7,000 | 10,200 | 1.99 | 98 | 97 |
| PSI-2 | 0.9320 | 10,000 | 14,300 | 2.30 | 98 | 124 |
| PSI-3 | 0.9542 | 15,000 | 21,600 | 2.14 | 95 | 140 |
| PSI-4 | 0.9655 | 20,000 | 25,400 | 2.45 | 88 | 157 |

Figure 4:
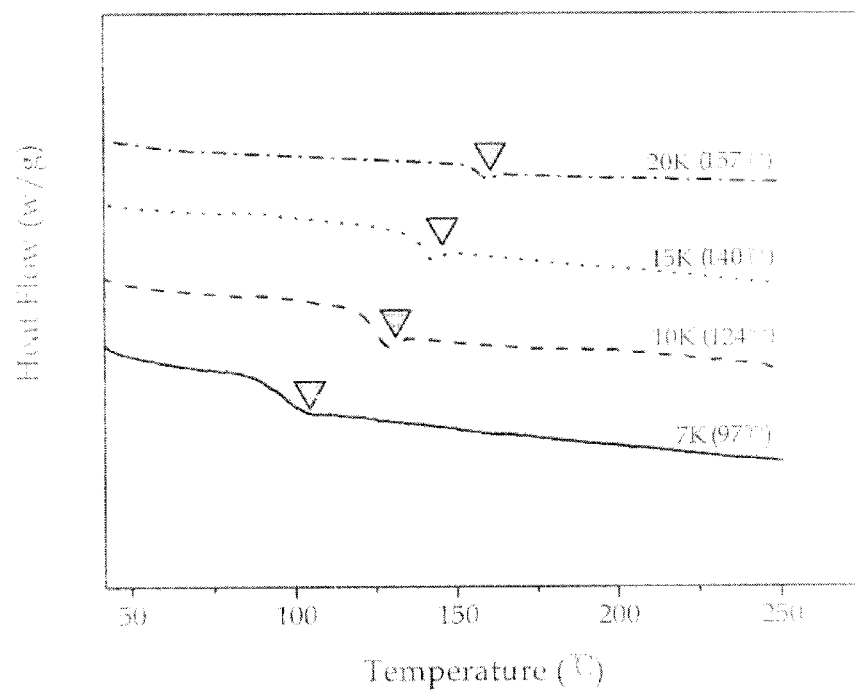
FIG. 4 shows curves of glass transition temperature changes of PSI according to molecular weight.
Figure 5:
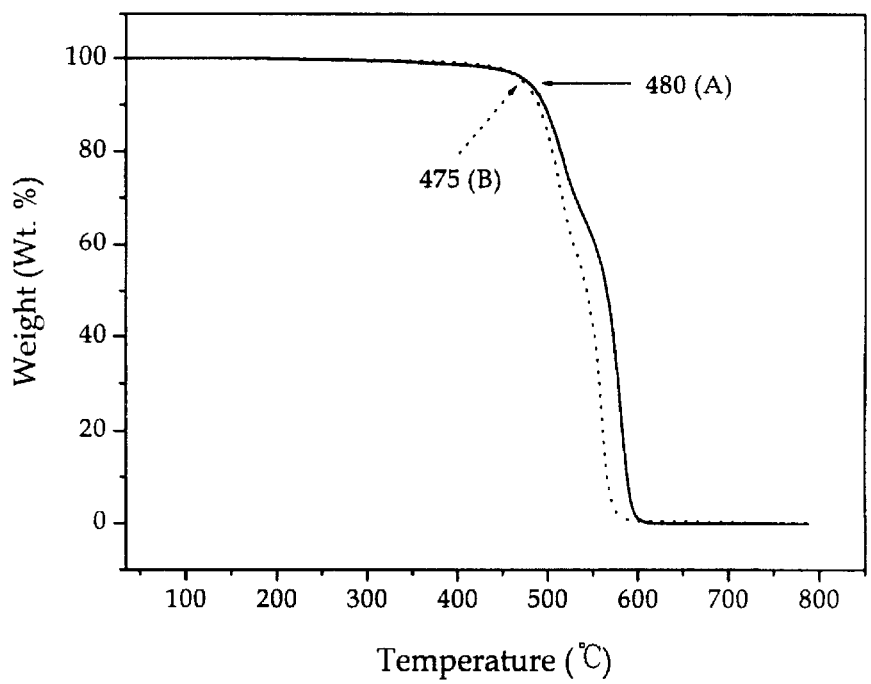
FIG. 5 shows a curve of thermal decomposition temperature change of PSI according to molecular weight.

For the prepared polymer, the glass transition temperature (Tg) was measured at 10° C./min by use of DSC (differential scanning calorimetry) under nitrogen atmosphere. FIG. 4 shows the change curves of Tg according to the molecular weight of PSI. When the molecular weight of PSI was increased from 7000 to 25,000, Tg was elevated from 97° C. to 157° C. In FIG. 5, thermal decomposition temperature of PSI was 450° C. or higher.

EXAMPLE 2

Preparation of Pentafluorophenylsulfone

Pentafluorophenylsulfone (5F-sulfone) (mp is 129° C.) was obtained by oxidation of 5F-sulfide (mp 89° C.), and could be prepared by the following reaction formula 2:

Reaction Formula 2

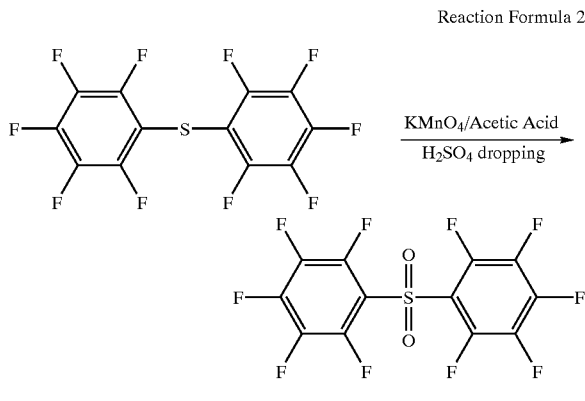

Figure 6:
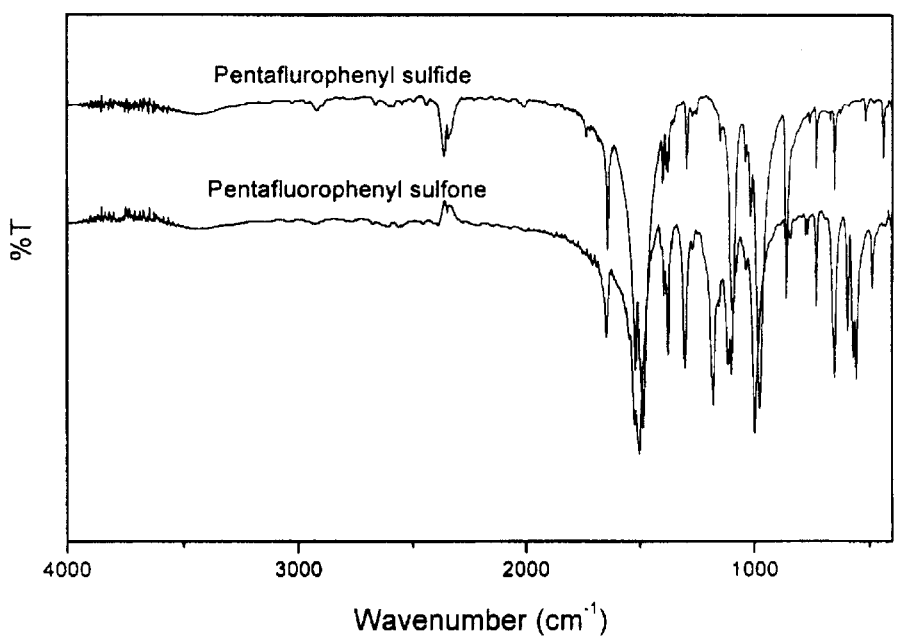
FIG. 6 shows FT-IR spectra of 5F-sulfide and 5F-sulfone.
Figure 7:
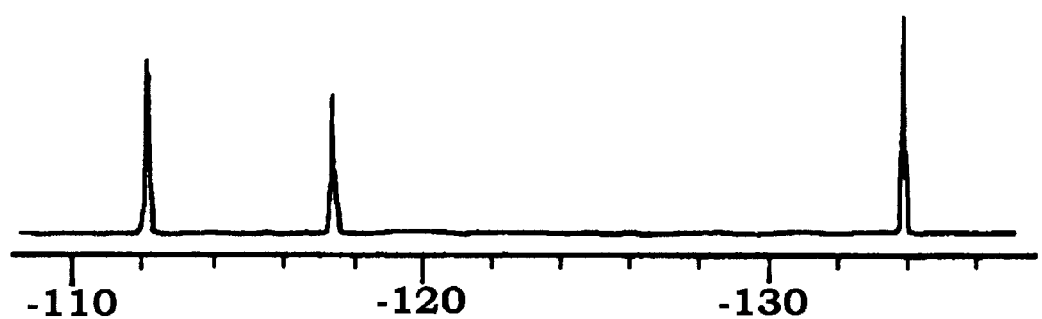
FIG. 7 shows $^{19}$F-NMR spectra of 5F-sulfone.
Figure 8:
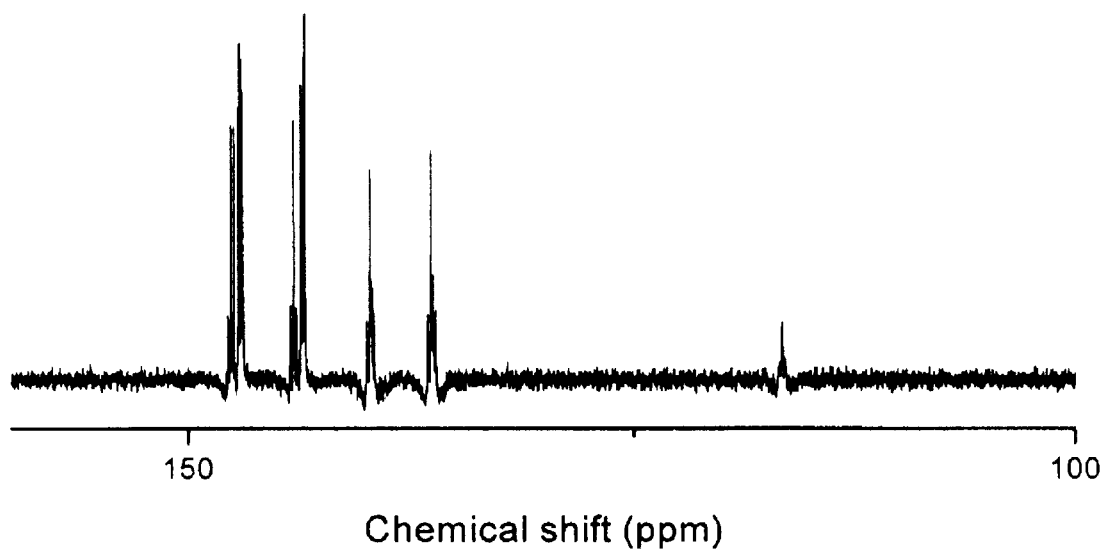
FIG. 8 shows $^{13}$C-NMR spectra of 5F-sulfone.

The reaction was performed at room temperature and the yield was 95% or more. The structure of said monomer was measured with NMR and FT-IR. FIG. 6 shows FT-IR spectra of 5F-sulfide and 5F-sulfone. In this drawing, 1500 and 1600 cm$^{-1}$ is the absorption zone corresponding to C=C double bonds, 1325 and 1150 cm$^{-1}$ to sulfonyl group, and 1000, 1100 and 1300 cm$^{-1}$ to aromatic C—F bonding. Analyzing the FT-IR spectrum, it can be seen that the absorption zone corresponding to sulfonyl group is newly formed and thus sulfides are transformed to sulfones. By using CFCl$_3$ as a standard material, $^{19}$F-NMR for 5F-sulfone is analyzed and the result is shown in FIG. 7. The peak for ortho-fluorine is −132.8 ppm, for para-fluorine is −138.1 ppm, and for meta-fluorine is −154.5 ppm. Fluorine at ortho-position was shifted to downfield because of attraction of electrons by sulfonyl group. Also, at meta-position, the peak was shifted downfield. In FIG. 8, there is shown a $^{13}$C-NMR spectrum of 5F-sulfone, analyzed by use of CDCl$_3$ as a standard material. From the $^{13}$C-NMR spectrum, it can be seen that four other carbons are present in 5F-sulfone.

EXAMPLE 3

Synthesis of Polyarylene ether Sulfone [PSO] containing Fluorine

Fluorine-containing PSO could be prepared by the following reaction formula 3:

Reaction Formula 3

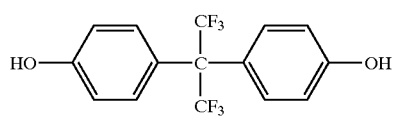

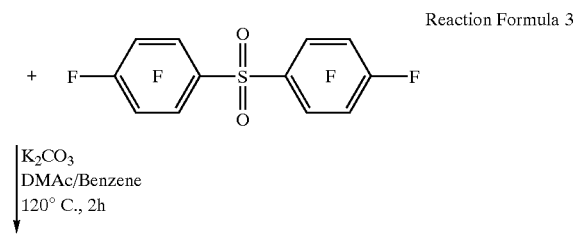

-continued

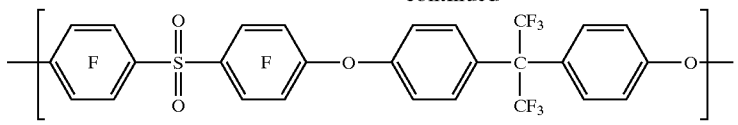

Figure 9:
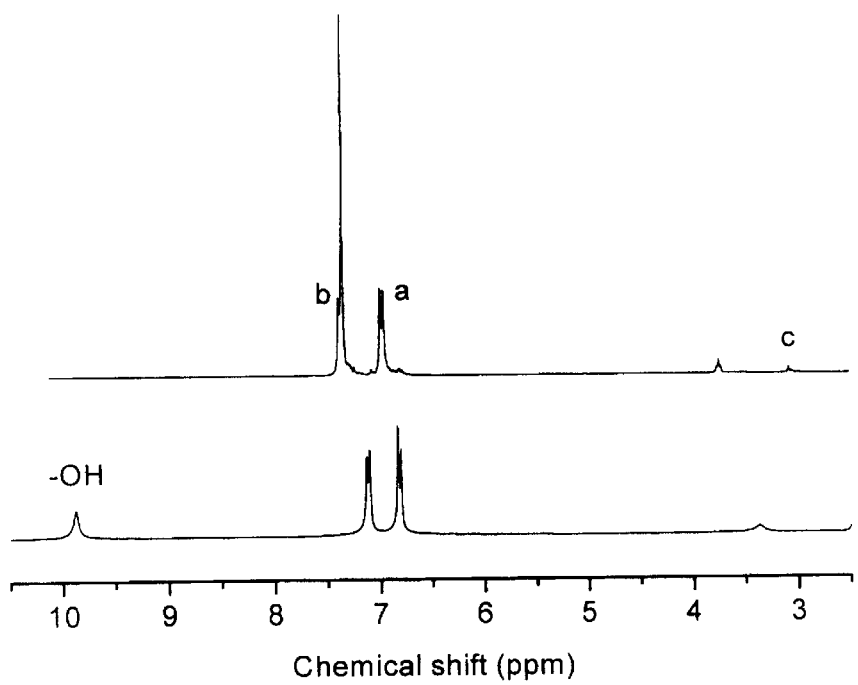
FIG. 9 shows $^1$H-NMR spectra of Poly(arylene ether sulfone) (PSO) (top) and 6F-BPA (down).
Figure 10:
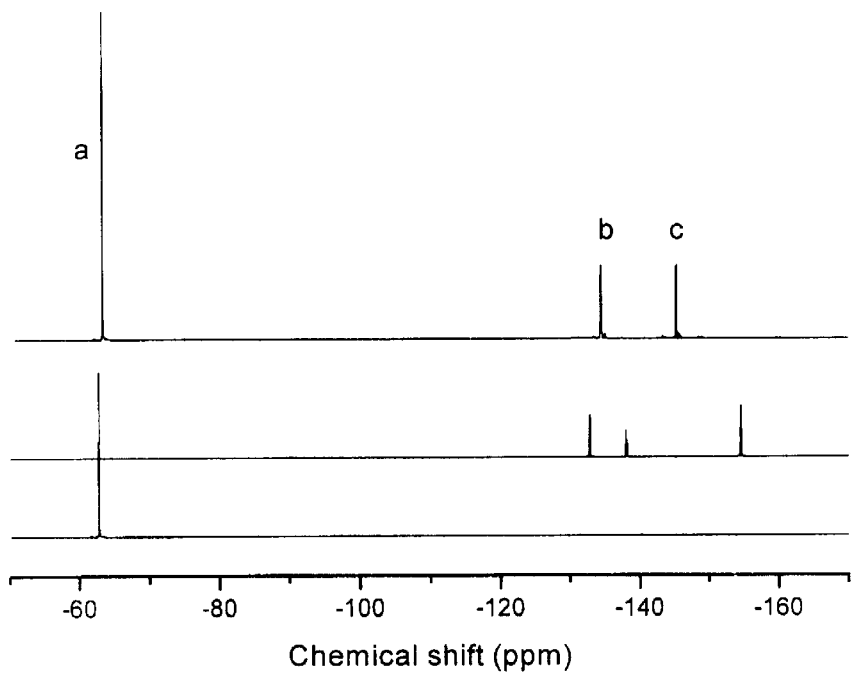
FIG. 10 shows $^{19}$F-NMR spectra of PSO (top), 5F-sulfone (medium) and 6F-BPA (down).
Figure 11:
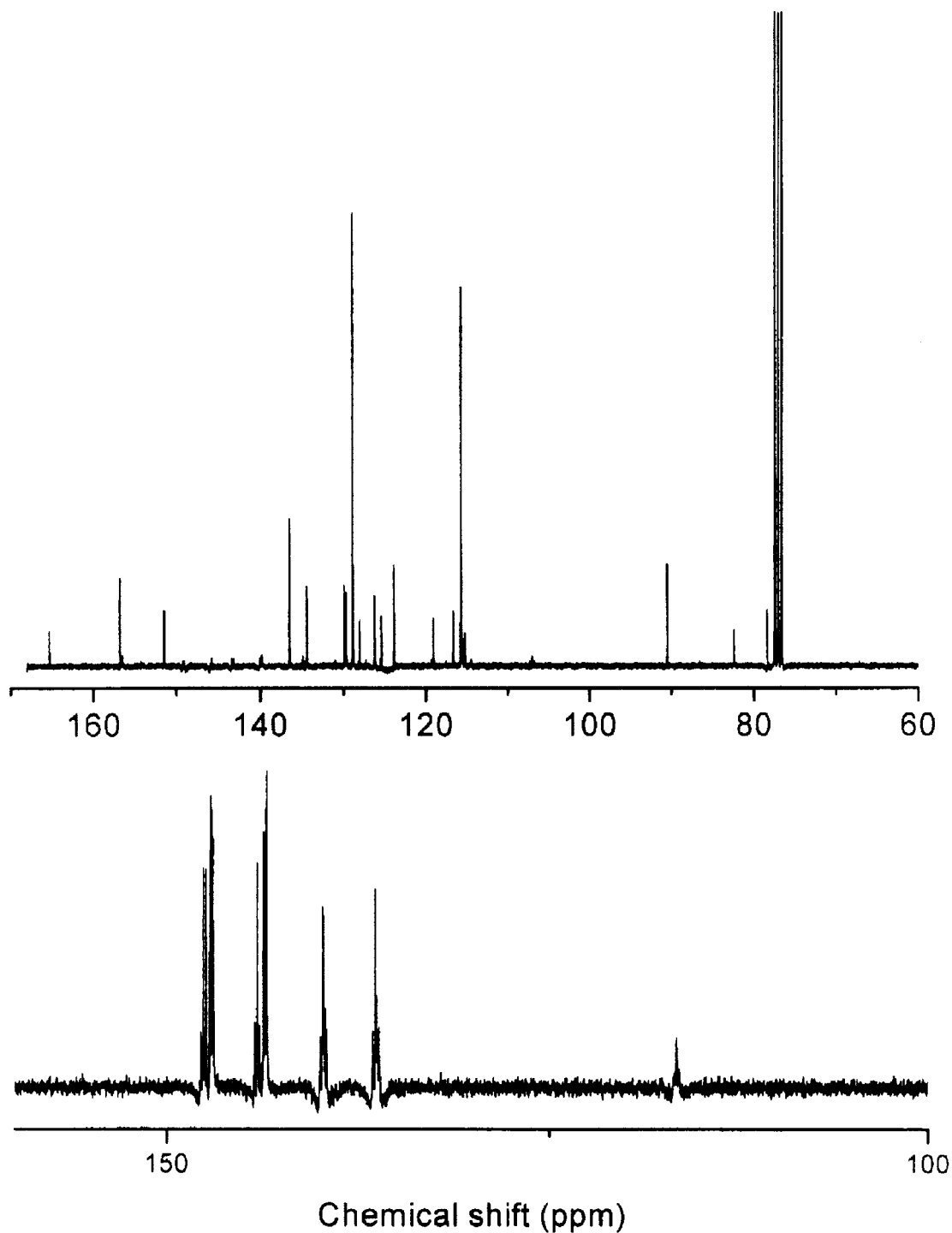
FIG. 11 shows $^{13}$C-NMR spectra of PSO and 6F-BPA (top), 5F-sulfone (down).

PSO was prepared in the same manner as the synthesis of PSI of Example 1, except that 5F-sulfone was used as the monomer. In the analyses of $^1$H-NMR (FIG. 9), $^{19}$F-NMR (FIG. 10) and $^{13}$C-NMR (FIG. 11) of PSO, like PSI, the peak of $^1$H was shifted downfield, and the width of the peak became broader, compared with the monomer. In the case of $^{19}$F-NMR, the fluorine peak at para-position in pentafluorophenyl group disappeared. This means that polymerization was successfully conducted. In addition, the peak in the $^{13}$C-NMR was shifted downfield and two peaks were integrated in one peak. Like the example 1, the molecular weight of PSO is shown in Table 2, below. The range of the molecular weight in PSO is 6,400–17,200 and the molecular weight distribution is 2.25–3.19.

Figure 12:
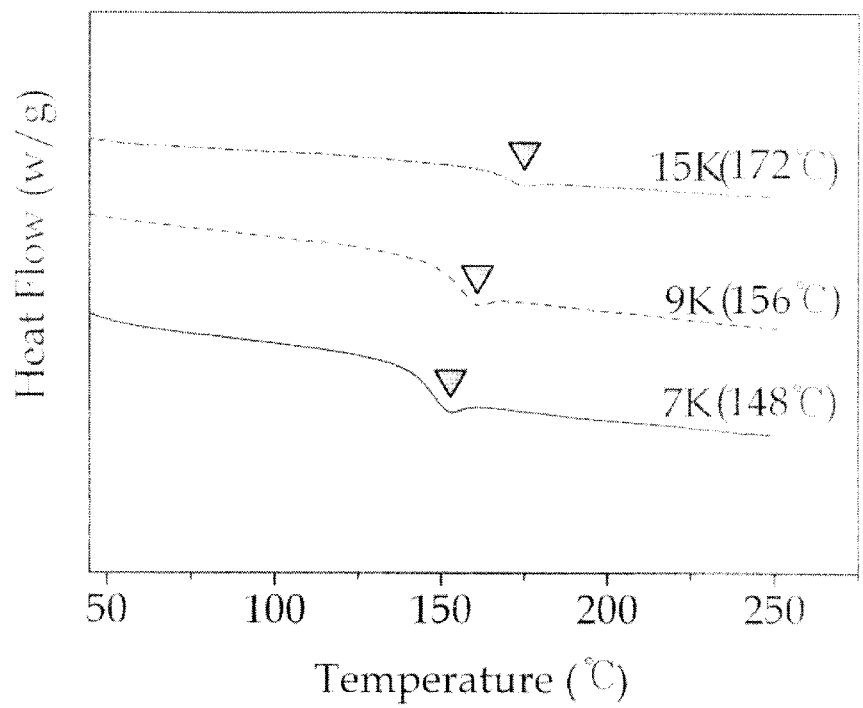
FIG. 12 shows curves of glass transition temperatures of PSO according to molecular weight.

The thermal analysis results of PSI and PSO prepared in examples 1 and 3 are shown in FIGS. 5 and 12. The glass transition temperature (Tg) of the prepared polymer was measured at 10° C./min by use of differential scanning calorimetry (DSC) under nitrogen atmosphere. In FIG. 12, Tg of PSO having similar molecular weights (12,000) to PSI is presented. Tg of PSO shown in FIG. 12 increased to 150° C. or higher, and the thermal decomposition temperature of PSO is 5° C. higher than that of PSI, as seen in FIG. 5.

EXAMPLE 4

Fluorine-containing PSO and PSI having PEP and EP

In order to increase solvent resistance of fluorine-containing PSO and PSI, PEP and EP groups were attached to terminals of PSO and PSI. The synthesis of PEP or EP-attached PSO was shown in the following reaction formula 4. This reaction procedure was conducted in the same manner as described in the synthesis of polyarylene ether sulfones, except that PEP or EP (three times the molecular weight of the high molecular weight polymer to be synthesized) was introduced after polymerization, along with $K_2CO_3$, and then the reaction was performed for an additional 2 hours.

TABLE 2

PROPERTIES OF SYNTHESIZED PSO

| | 6F-BPA/ Penta Fluorosulfide | Calculated M.W. | Observed M.W. | Degree of Dispersion | Yield (%) | Glass Transition Temp. (° C.) |
|---|---|---|---|---|---|---|
| PSO-1 | 0.8949 | 7,000 | 6,400 | 2.75 | 92 | 148 |
| PSO-2 | 0.9209 | 9,000 | 10,400 | 2.25 | 91 | 156 |
| PSO-3 | 0.9406 | 12,000 | 15,300 | 3.19 | 97 | 163 |
| PSO-4 | 0.9522 | 15,000 | 17,200 | 2.75 | 98 | 172 |

Reaction Formula 4

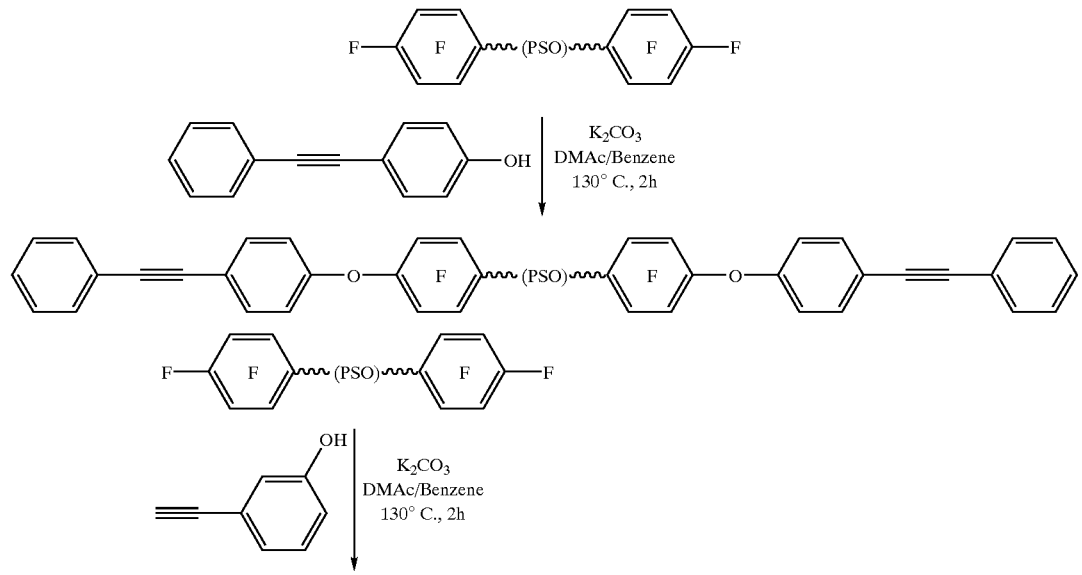

-continued

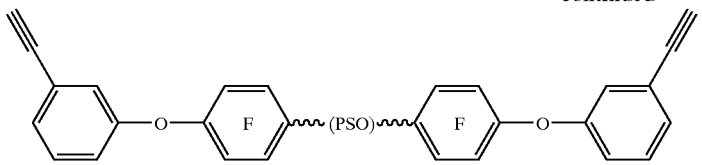

Figure 13:
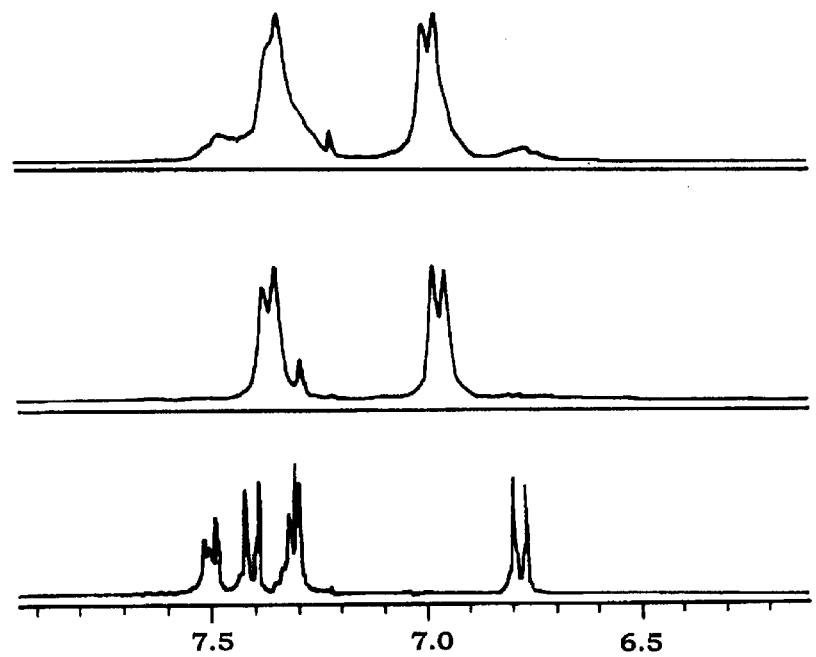
FIG. 13 shows $^1$H-NMR spectra of PEP-PSO (top), PSO (medium) and PEP (down).
Figure 14:
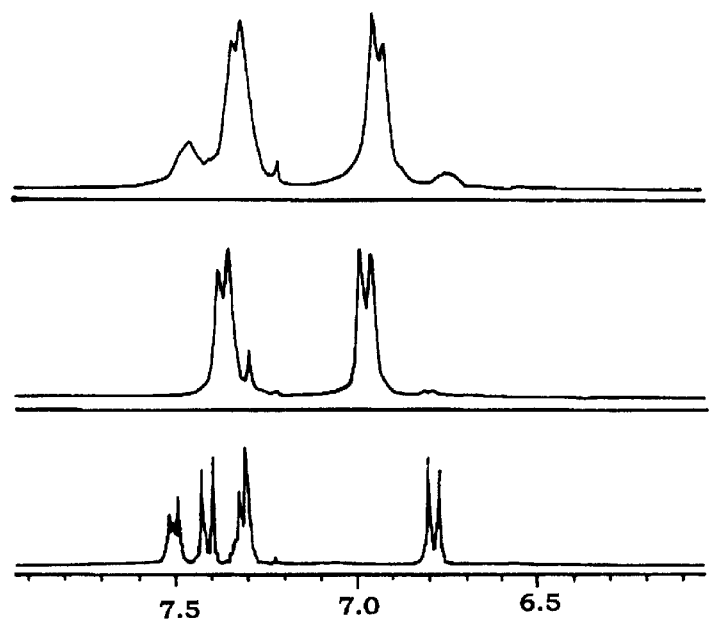
FIG. 14 shows $^{13}$C-NMR spectra of PEP-PSO (top), PSO (medium) and PEP (down).
Figure 15:
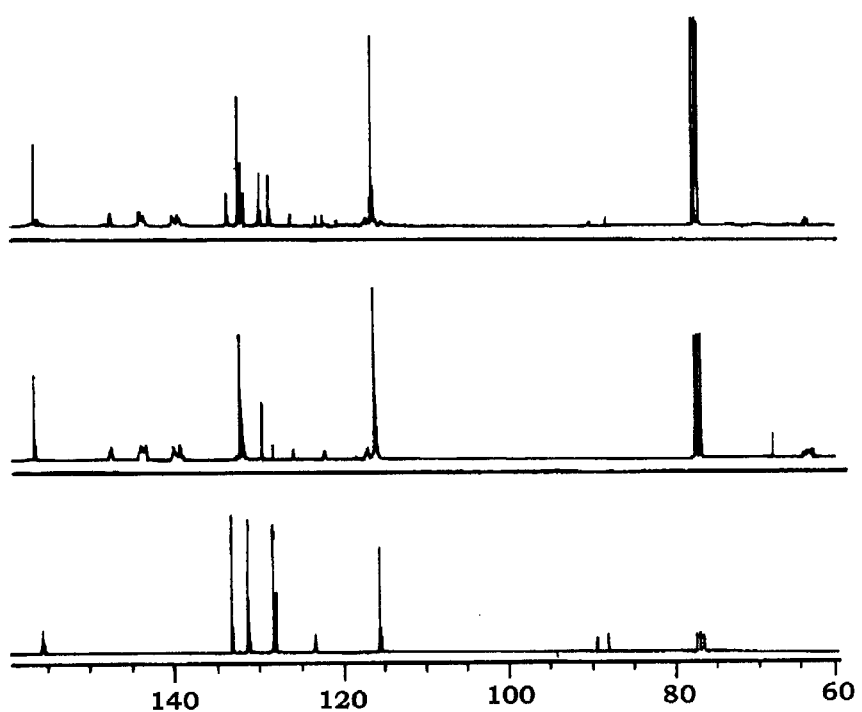
FIG. 15 shows $^1$H-NMR spectra of PEP-PSI (top), PSI (medium) and PEP (down).
Figure 16:
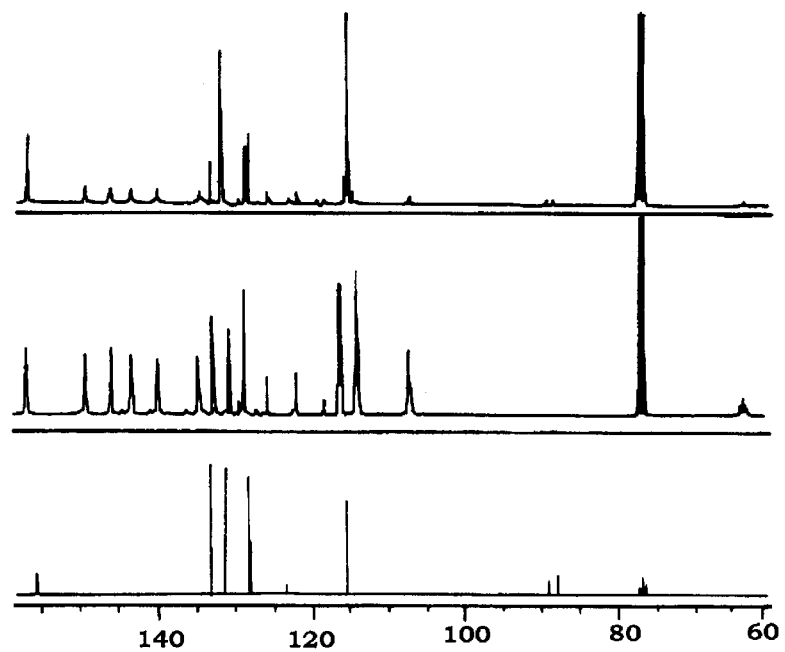
FIG. 16 shows $^{13}$C-NMR spectra of PEP-PSI (top), PSI (medium) and PEP (down).
Figure 17:
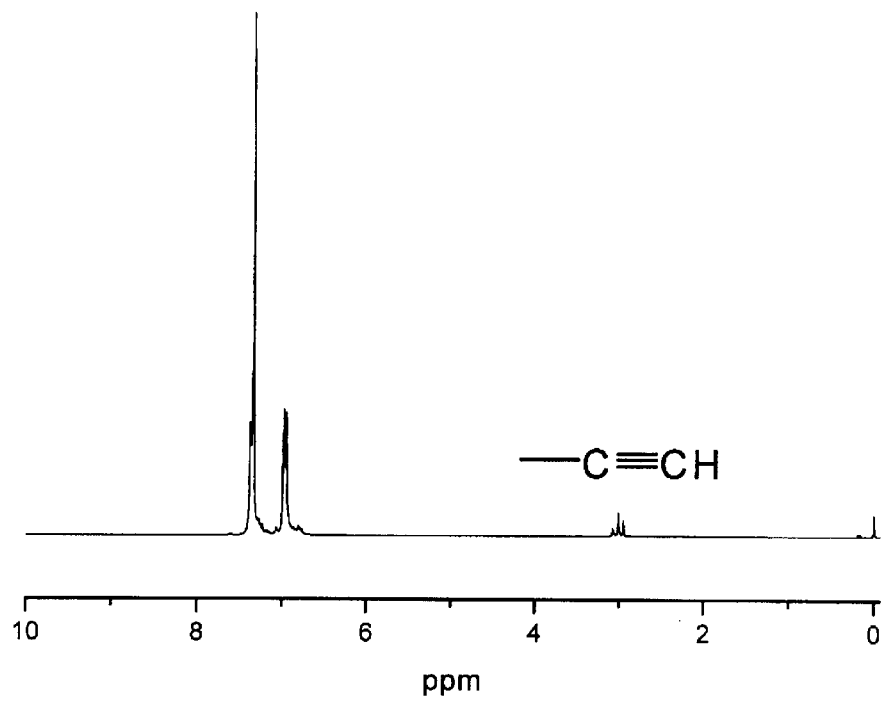
FIG. 17 shows $^1$H-NMR spectra of EP-PSI.
Figure 18:
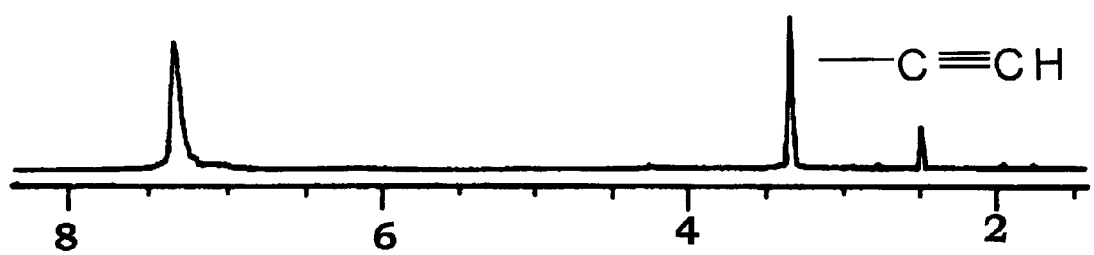
FIG. 18 shows $^1$H-NMR spectra of EP-PSO (NMR solvent: DMSO).
Figure 19:
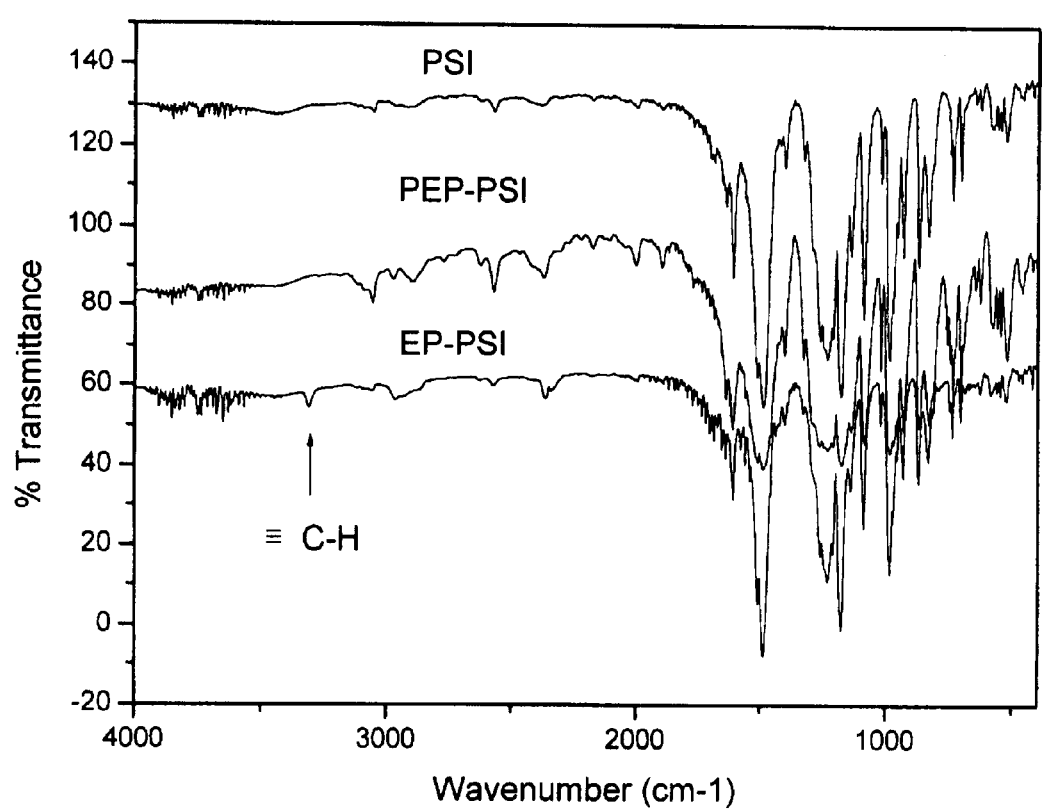
FIG. 19 shows FT-IR spectra of PSI, PEP-PSI and EP-PSI.
Figure 20:
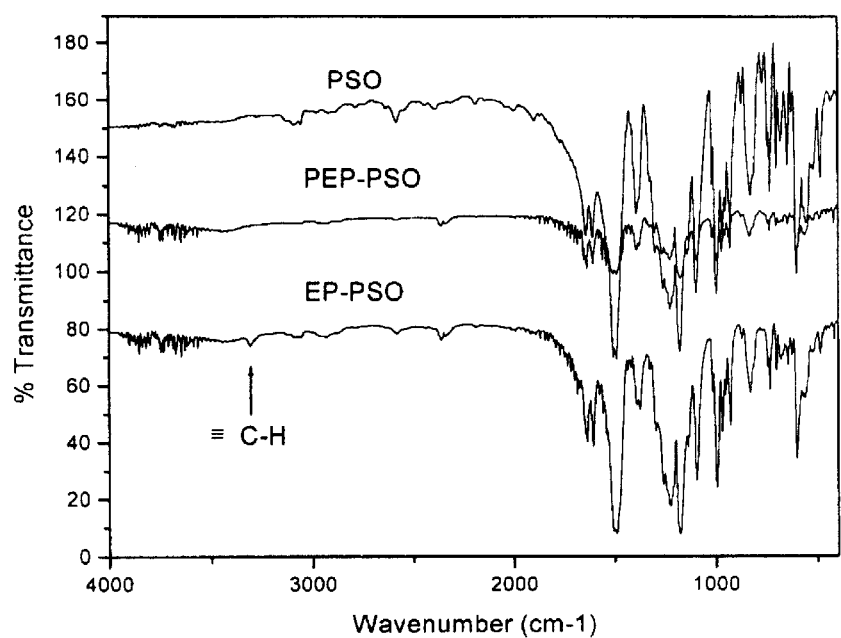
FIG. 20 shows FT-IR spectra of PSO, PEP-PSO and EP-PSO.

The analysis was conducted by use of ¹H-NMR (FIGS. 13 and 15), and ¹³C-NMR (FIGS. 14 and 16). From the analysis result of ¹H-NMR of PEP-bonded PSO and PSI, it can be seen that the peaks corresponding to hydrogen in PEP are 7.31, 7.38, and 7.50 ppm, at which the reaction is conducted. In the case of EP-bonded PSI and PSO, the peaks corresponding to hydrogen in EP are 2.94 and 2.95 ppm. From this result, it is confirmed that EP is well bonded to terminals of polymers (FIGS. 17 and 18). As seen in FIGS. 19 and 20, the reaction is successfully performed because the peaks corresponding to ethynyl group are shown in FT-IR spectrum.

Figure 21:
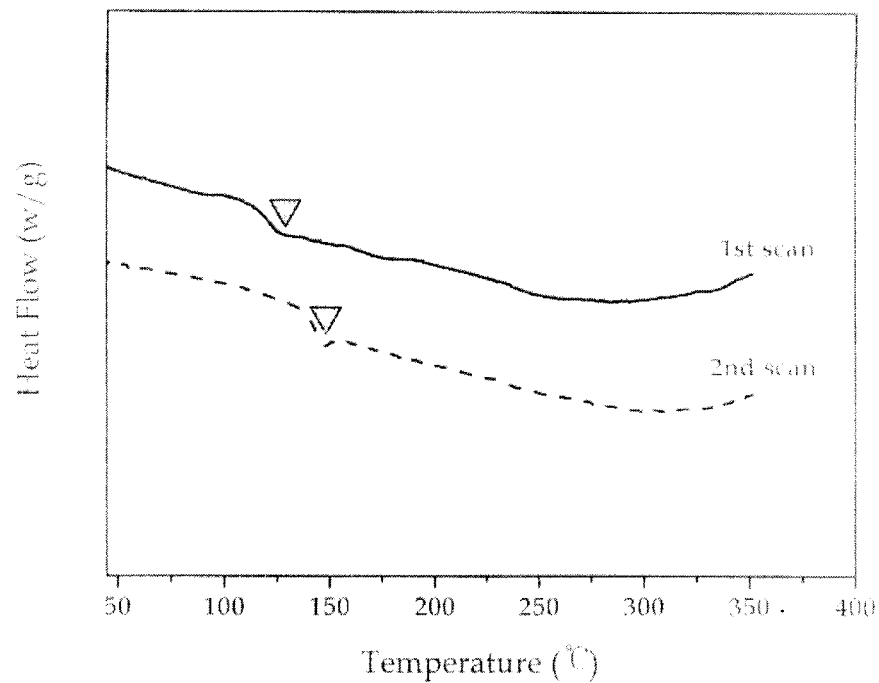
FIG. 21 shows curves of glass transition temperature changes of PEP-PSI according to the number of heat treatments.
Figure 22:
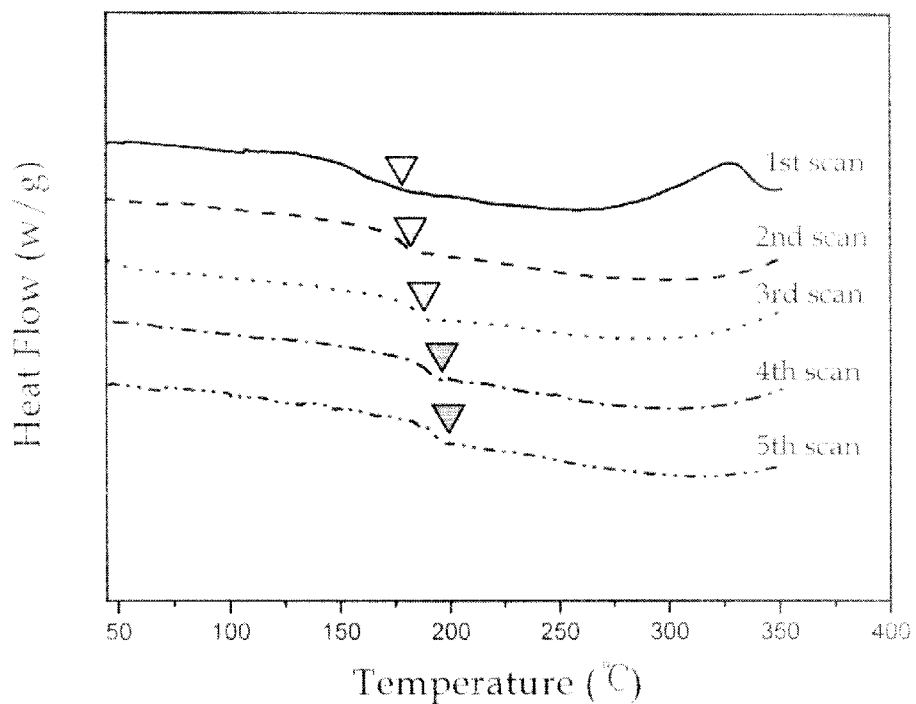
FIG. 22 shows curves of glass transition temperature changes of PEP-PSO according to the number of heat treatments.
Figure 23:
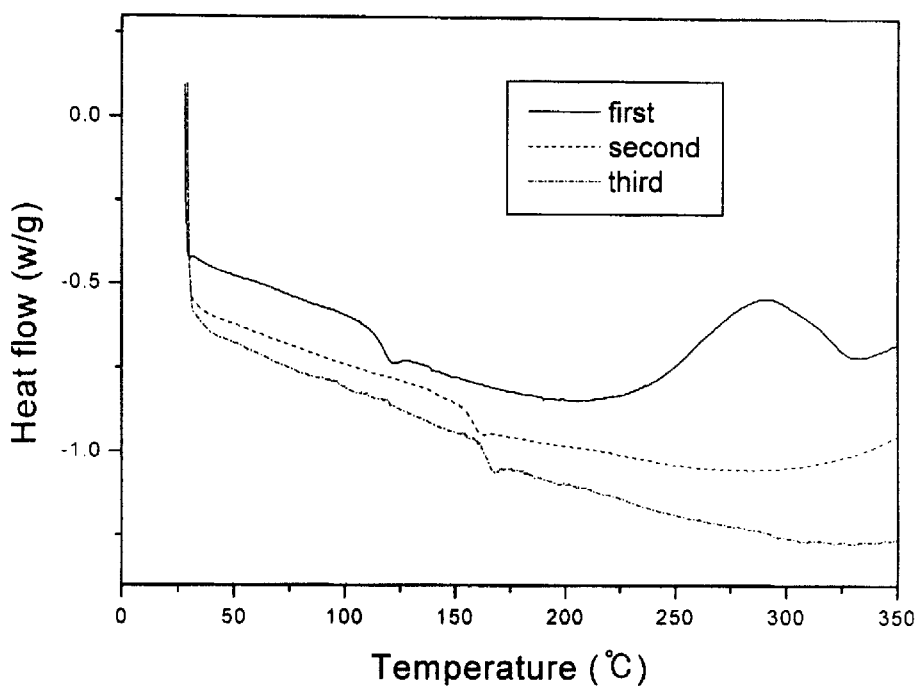
FIG. 23 shows curves of exothermic peak and glass transition temperature changes of EP-PSI according to the number of heat treatments.
Figure 24:
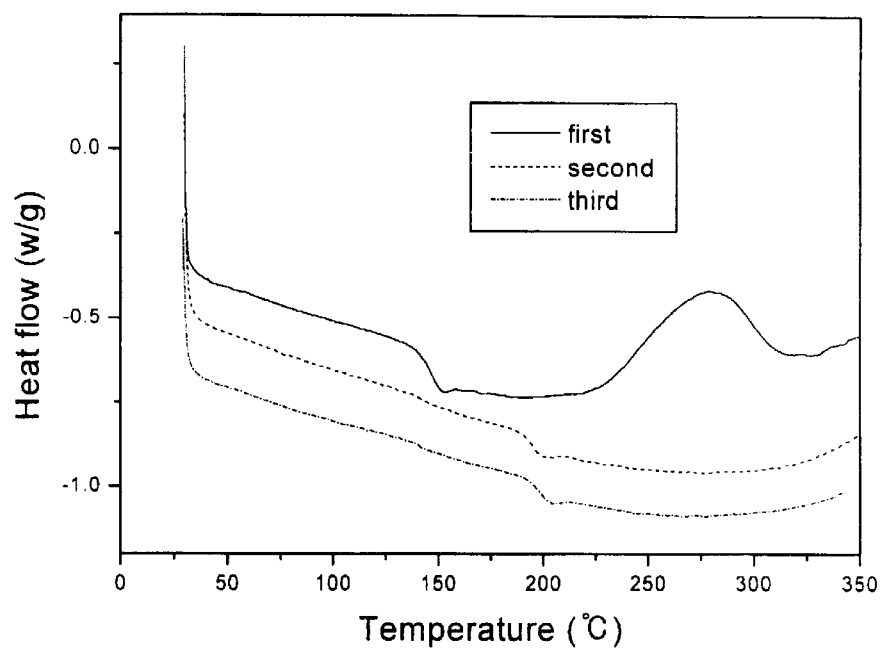
FIG. 24 shows curves of exothermic peak and glass transition temperature changes of EP-PSO according to the number of heat treatments.
Figure 25:
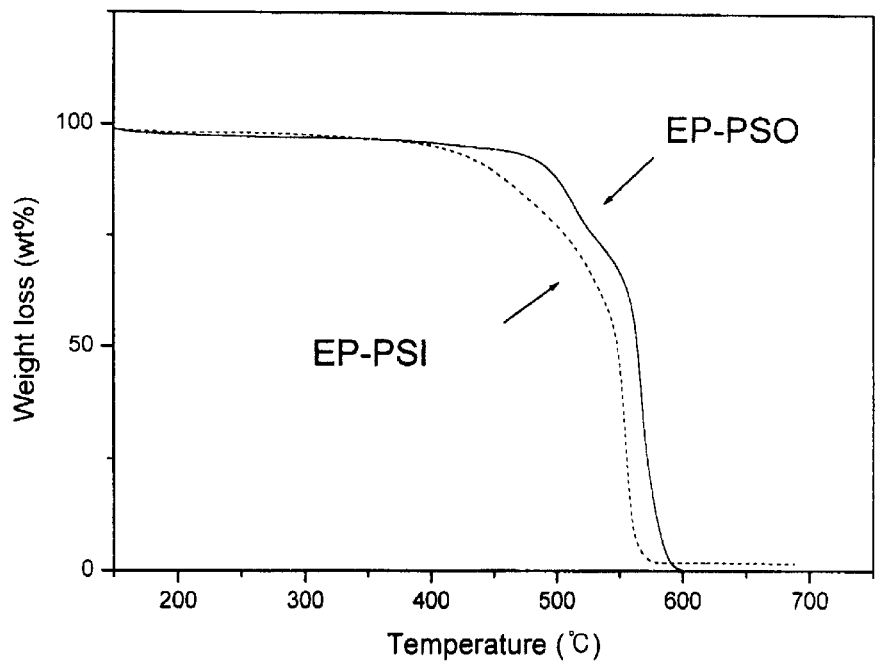
FIG. 25 shows curves of analyzed heat weights of EP-PSI and EP-PSO.

When the degree of crosslinking is increased, the glass transition temperature is generally elevated. In FIGS. 21 and 22, there are shown the glass transition temperatures according to the scanning numbers of PEP-PSI and PEP-PSO. The glass transition temperatures of PEP-PSI and PEP-PSO are increased, depending on the increase of scanning numbers, whereby it can be deduced that the crosslinking reaction is completed. However, the exothermic peak when the crosslinking reaction is conducted is very small for PEP-PSO and hardly seen for PEP-PSI. This is believed to be due to the crosslinking reaction being very slowly performed. Meanwhile, as shown in FIGS. 23 and 24, the glass transition temperatures of EP-PSO and EP-PSI are increased according to increasing the numbers of glass transition scans, and the exothermic peak by the crosslinking is surely shown in the first scanning. Additionally, in the thermal weight analysis result, the crosslinked polymer is superior in thermal stability to not-crosslinked polymer (FIG. 25).

Figure 26:
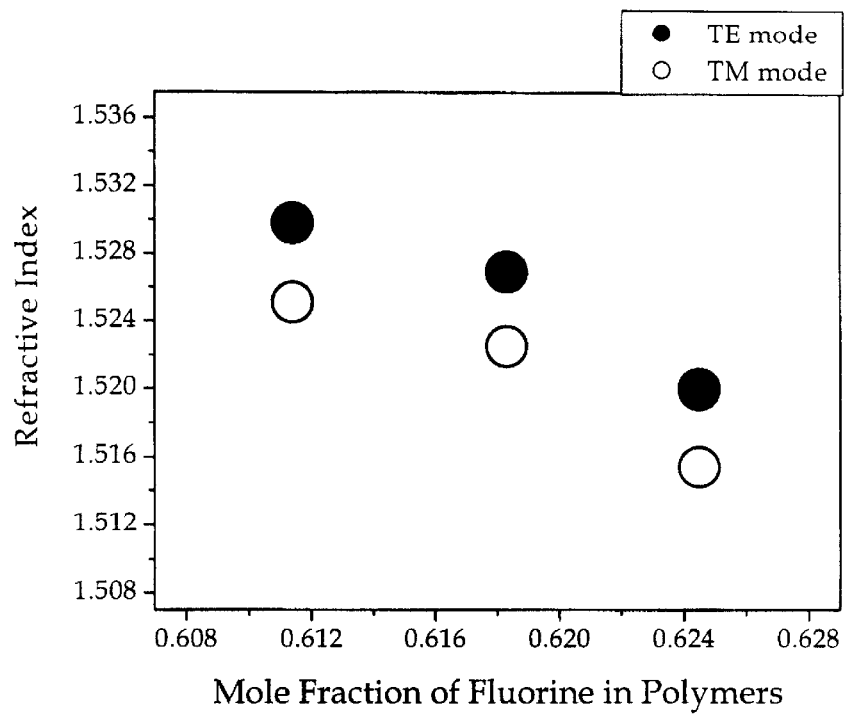
FIG. 26 shows changes of refractive index of thermally crosslinkable PEP-PSI according to a content of fluorine.
Figure 27:
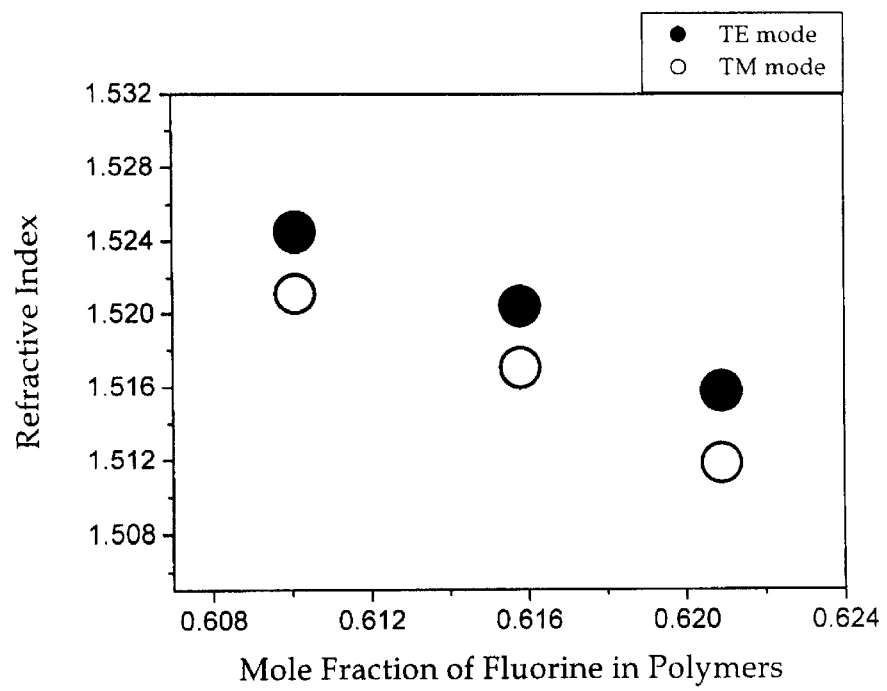
FIG. 27 shows changes of refractive index of thermally crosslinkable PEP-PSO according to a content of fluorine.
Figure 28:
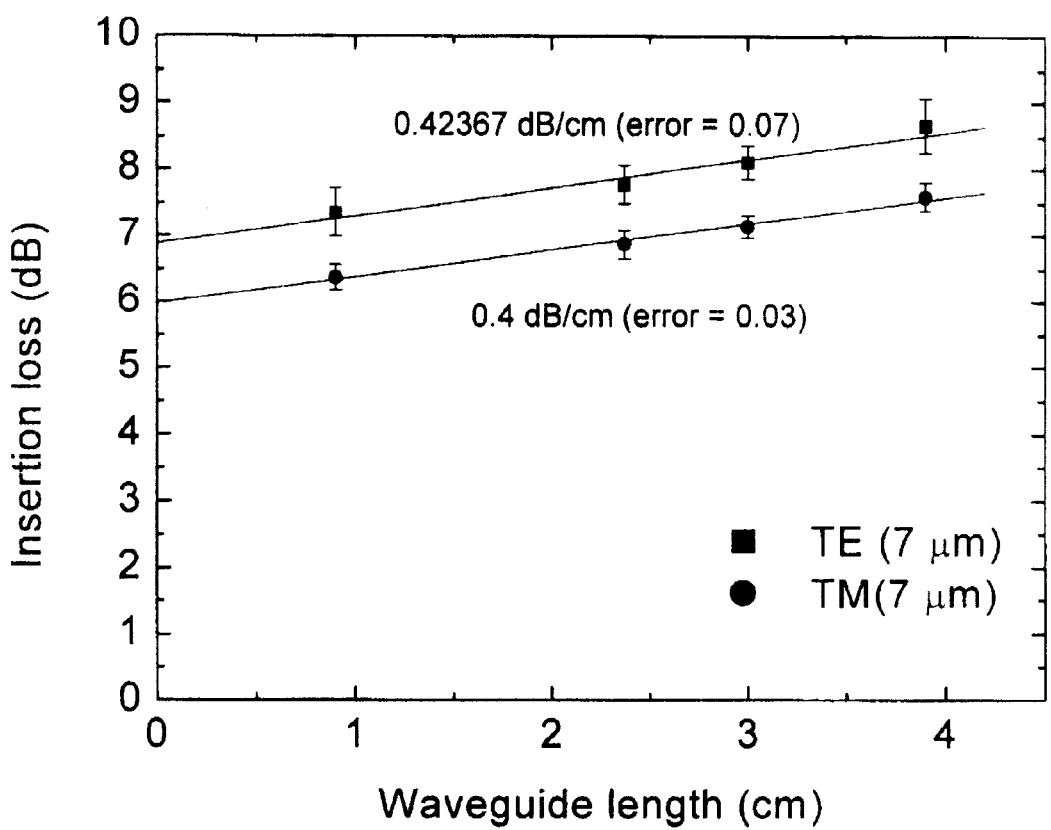
FIG. 28 shows light loss graphs of thermally crosslinkable EP-PSI.

In FIGS. 26 and 27, the refractive index of PEP-PSI and PEP-PSO is shown. Said refractive index for two materials is similar, regardless of their different structures. In two materials, when the molar fraction of fluorine is increased, the refractive index is lowered. In addition, light loss for high molecular weight polymer of the present invention is measured and shown in FIG. 28. It is noted that the light loss has very low value of about 0.4 dB/cm.

In accordance with the method of the present invention, a high molecular weight polymer can be easily synthesized by use of sulfone and sulfide monomer replaced with fluorine through polycondensation, which has an improvement in reduced light loss of final high molecular weight polymer, and increased physical properties, such as solvent resistance, heat resistance and water resistance, by binding ethylnyl group capable of thermally crosslinking to terminals of the polymer.

The synthesis of high molecular weight polymer with low light loss and birefringence and excellent bonding force is used to manufacture an optical waveguide device having high performance, whereby the optical communication industry can be advanced.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing polyarylene ether sulfide derivatives or polyarylene ether sulfone derivatives containing fluorine, by polycondensing pentafluorophenyl sulfide or pentafluorophenyl sulfone monomer as represented in the following formula 1 with a dihydroxy compound selected from the group consisting of 9,9'-bis(4-hydroxyphenyl)fluorene, 2,2',3,3',5,5',6,6'-octafluoro-4,4'-biphenol, 4,4'-isopropylenediphenol or 4,4'-(hexafluoroisopropylidene)diphenol (6F-BPA):

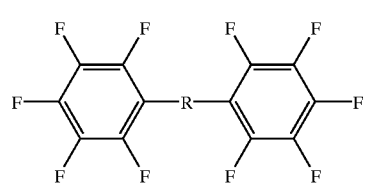

Formula 1 wherein, R is sulfide (—S—) or sulfone (—SO₂—).

2. The method as set forth in claim 1, wherein said dihydroxy compound is 4,4'-(hexafluoroisopropylidene)diphenol (6F-BPA).

3. The method as set forth in claim 1, further comprising the step of attaching thermally crosslinkable ethynylphenol or phenylethynylphenol to the end of the polyarylene ether sulfide derivatives or polyarylene ether sulfone derivatives.

4. The method as set forth in claim 2, further comprising the step of attaching thermally crosslinkable ethynylphenol or phenylethynylphenol to the end of the polyarylene ether sulfide derivatives or polyarylene ether sulfone derivatives.

5. Polyarylene ether sulfide derivatives or polyarylene ether sulfone derivatives, prepared by the method of claim 1.

6. Polyarylene ether sulfide derivatives or polyarylene ether sulfone derivatives as set forth in claim 5, wherein said dihydroxy compound is 4,4'-(hexafluoroisopropylidene)diphenol (6F-BPA). derivatives.

7. Polyarylene ether sulfide derivatives or polyarylene ether sulfone derivatives, prepared by the method of claim 3.

* * * * *